Feb. 5, 1935.  W. F. MERRITT  1,990,412
SANDWICH COOKER
Filed Sept. 8, 1932   2 Sheets-Sheet 1
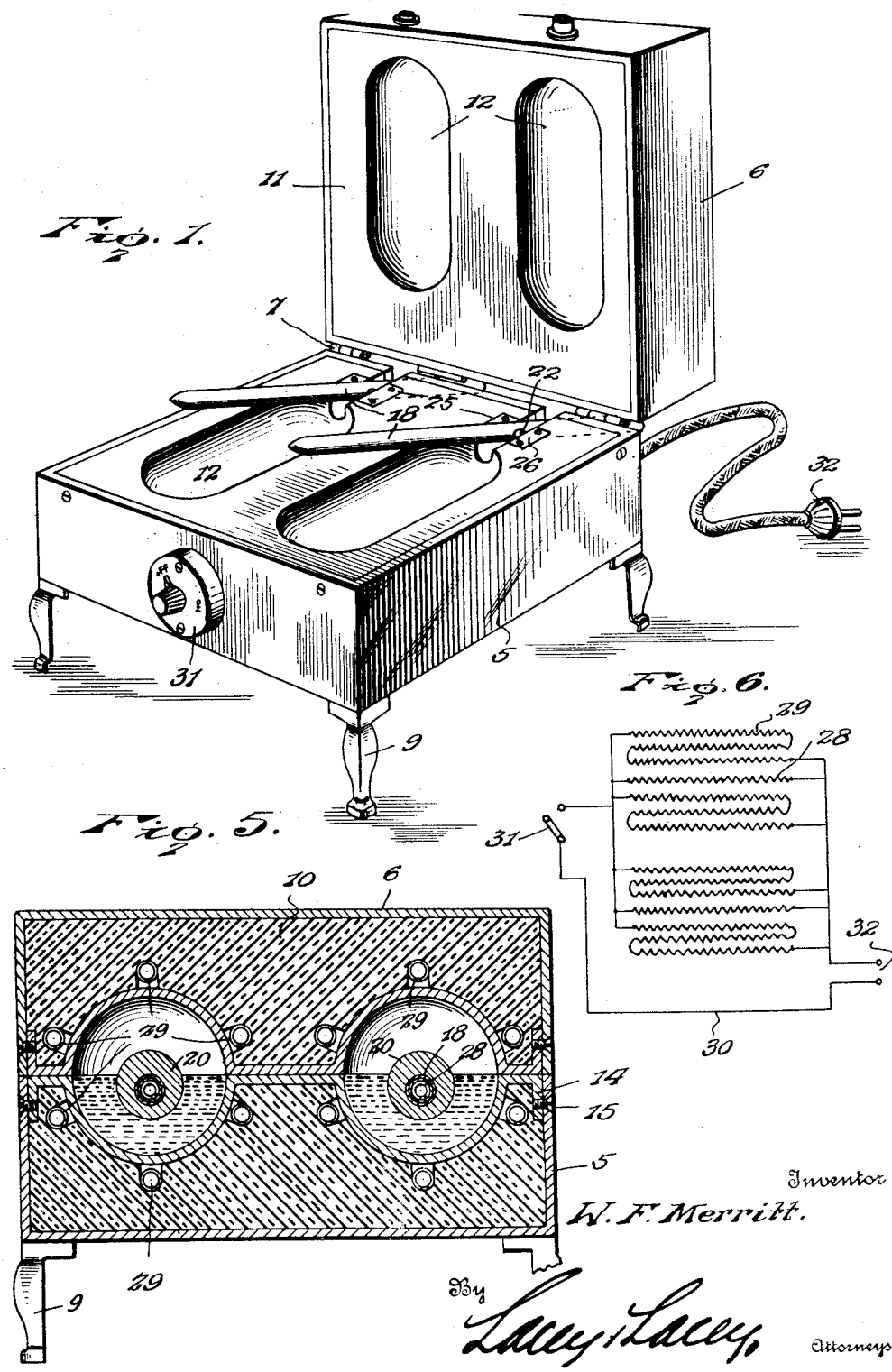

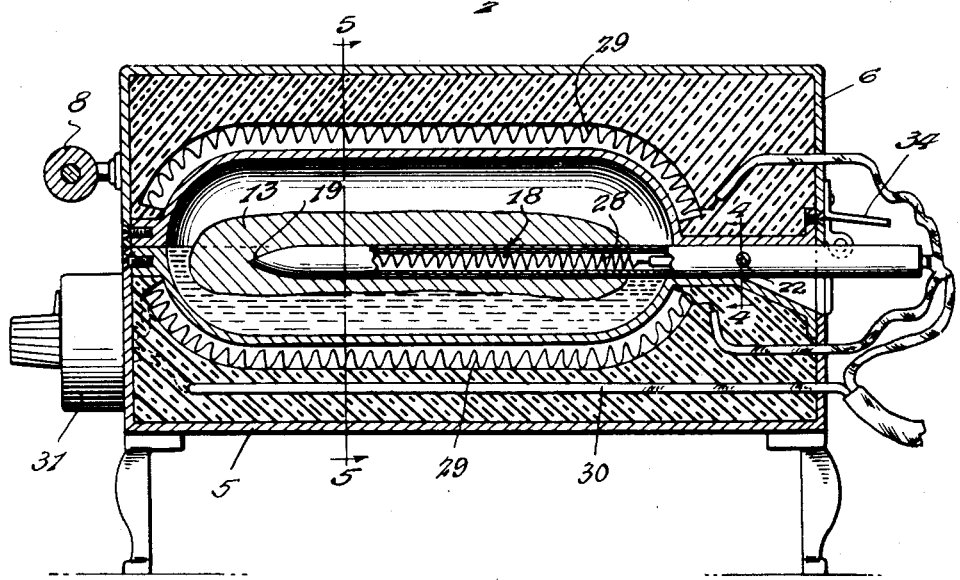
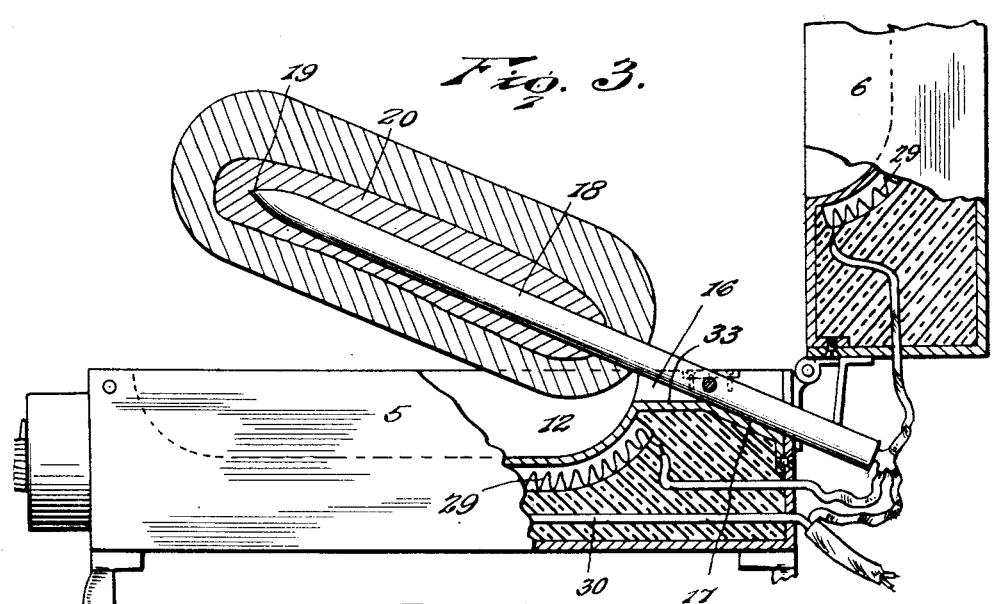
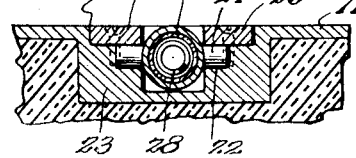

Patented Feb. 5, 1935

1,990,412

UNITED STATES PATENT OFFICE 1,990,412

SANDWICH COOKER

William F. Merritt, Livingston, N. J.

Application September 8, 1932, Serial No. 632,241

9 Claims. (Cl. 219—19)

This invention relates to cookers and more particularly to a device for baking or otherwise cooking frankfurter sandwiches.

The object of the invention is to provide a cooker of simple and novel construction by means of which the elements constituting a sandwich, such as a frankfurter sausage, or other kind of meat and the enveloping batter, may be conveniently cooked at one operation, whereby the natural juices of the meat are conserved and allowed to permeate the batter so that the true flavor of the meat is imparted to the batter and a more succulent and tasty edible is obtained than heretofore.

A further object of the invention is to provide a cooker including pivotally united sections having batter receiving cavities and a meat impaling element movable to operative position within one of the cavities and to inoperative position to lift the cooked sandwich from said cavity when the sections are opened.

A further object is to provide means for centering the meat impaling member within one cavity and means carried by one of the sections and adapted to engage the pivoted end of the meat impaling member for elevating said member, together with the cooked sandwich, from the cavity.

A further object is to provide electrical elements for simultaneously heating the batter receiving cavities and the meat impaling member whereby a uniform cooking of the elements constituting the sandwich is effected.

A further object is to provide means for applying heat directly to the inside of the frankfurter as well as to the exterior thereof so that the sausage will be thoroughly cooked.

A still further object of the invention is generally to improve this class of devices so as to increase their utility, durability and efficiency.

In the accompanying drawings forming a part of this specification:

Figure 1 is a perspective view of an improved cooker constructed in accordance with the present invention, showing the same in open position and ready to receive a frankfurter on the impaling member.

Figure 2 is a transverse sectional view of the cooker closed, the frankfurter and batter being shown within the cooking cavity.

Figure 3 is a sectional view partly in side elevation, showing the cooked sandwich in elevated position and ready to be removed from the impaling member.

Figure 4 is a transverse sectional view on the line 4—4 of Figure 2, showing the manner of pivotally mounting the impaling member.

Figure 5 is a transverse sectional view on the line 5—5 of Figure 2.

Figure 6 is a diagram of the electrical heating elements.

Similar numerals of reference indicate corresponding parts in all the figures of the drawings.

The improved cooker forming the subject matter of the present invention comprises a casing or housing preferably constructed from aluminum or other suitable material and formed in two sections 5 and 6 pivotally connected at 7, the upper section 6 being provided with a suitable handle 8 whereby the upper section may be swung upwardly and laterally to open position. The lower section 5 constitutes the base or stand of the cooker and is provided with depending feet 9 so as to elevate the stand above the surface of a table or other suitable support and permit the free circulation of air thereunder. Disposed within each section 5 and 6 is a block of insulating material 10, said insulating material being retained in position by face plates 11, each provided with one or more cavities 12 adapted to receive the batter from which the bun or roll 13 is formed. The face plates 11 are provided with angularly disposed lugs or flanges 14 having openings formed therein for the reception of fastening screws 15 by means of which the face plates may be detachably secured to the sections so that they may be readily removed when necessary to permit access to the heating elements hereinafter referred to. The material constituting the face plate of the lower section or stand 5 is pressed, molded or otherwise formed with a longitudinal groove 16 which opens into the adjacent cavity 12 and has its rear wall inclined downwardly, as indicated at 17, to form a stop for an impaling member 18. The impaling members 18, one of which coacts with each batter receiving cavity, are hollow or tubular in cross section and are each provided with a sharpened point 19 on which the frankfurter 20 or other meat to be cooked is impaled. Extending laterally from opposite sides of each impaling member are pins or trunnions 21 mounted in suitable bearings 22 formed in thickened portions 23 on the face plate 11, said face plate being provided with seats or depressions 24 adapted to receive cover plates 25 which hold the trunnions 21 in their bearings and are detachably secured to the face plate by screws or similar fastening devices 26.

Disposed within each impaling member 18 is a tubular sheath of isinglass, asbestos or other suitable insulating material 27 and arranged within this insulating sheath is a heating element or coil 28 which, when the frankfurter is placed on the impaling member, heats or cooks the interior thereof. Suitable heating elements or coils 29 are also arranged around the batter receiving cavities 12 and embedded in the insulating blocks 10 for heating and cooking the batter in said cavities. The heating elements 28 and 29 are connected in an electrical circuit 30 with the terminals of a switch 31 of conventional construction and also connected in said circuit is a plug 32 which may be inserted in the socket of an ordinary house lighting circuit for the purpose of conducting current to the heating elements to effect the cooking of the sandwich. It will here be noted that the bottom wall 33 of the seat or groove 16, by engagement with the adjacent impaling member 18, forms a stop for limiting the downward movement thereof and thus centers the impaling element with the sausage thereon within the adjacent cavity, as best shown in Figure 2 of the drawings. The rear end of each impaling member is extended longitudinally beyond its pivot 21 so as to project a short distance beyond the casing and secured to the upper section 6 of the casing are laterally extending arms 34 which, when the upper section 6 is swung to open position, bear against the extended portions of the impaling members and tilt said extended portions downwardly until they engage the inclined stops 17 and in which position the free ends of the impaling members will be lifted out of the cavities so as to present the cooked sandwiches in convenient position to be withdrawn therefrom, as best shown in Figure 3 of the drawings.

In operation, the upper section 6 is swung upwardly to open position, thereby elevating the points of the impaling members. The cavities in the lower section 5 are then filled or partially filled with batter or other material from which the roll is to be baked, and a frankfurter, hamburger or other kind of meat impaled on each of the members 18 and the upper section 6 swung downwardly to closed position. As the cover swings downwardly the arms 34 will be elevated out of engagement with the extended ends of the impaling members which will drop until said impaling members engage the lower walls 33 of the grooves 16 and in which position the frankfurters will be centered within the batter in the lower cavities, as best shown in Figure 2 of the drawing. The switch 31 is then moved to on position, thus energizing the heating elements and baking the batter and, at the same time, cooking the sausages. After the sandwiches have been thoroughly cooked, the switch is turned off and the upper section 6 moved to open position, thereby causing the arms 34 to bear against and depress the extended ends of the impaling members 18 so that the cooked sandwiches may be readily removed from said impaling members. It will here be noted that inasmuch as the impaling members are provided with heating elements the interior or core of the sausages will be thoroughly cooked and the exterior of the sausages will likewise be cooked by the heat from the heating elements 29. It will further be noted that when the cooked sandwiches are removed from the impaling members a cylindrical opening will be formed in each frankfurter which opens through one end of the sandwich and, if desired, this opening may be utilized for the reception of mustard or other condiment to impart the desired flavor to the sandwich. It will, of course, be understood that the batter in the cavities of the lower section, when subjected to the action of the heating elements, will rise within the upper cavities and thus encircle the sausages so that when the sandwiches are cooked the sausages will be entirely enveloped in the cooked batter and present the appearance of ordinary rolls.

While I have shown the cooker in the form of a unit having two cavities, it will, of course, be understood that the cookers may be provided with as many cavities as desired and in certain cases, a gang of said cookers may be connected together and controlled by a single switch, or, if desired, units may be made with a single cavity. It will furthermore be understood that the casings may be made in different sizes and shapes and constructed of any desired material without departing from the spirit of the invention.

Having thus described the invention, what I claim is:

1. A sandwich cooker comprising relatively stationary and movable sections having batter receiving cavities, a meat impaling member pivotally connected with the stationary section for movement to operative position within one of the cavities, for centering the meat within the cavity, and means for directly heating the sections and said impaling member to simultaneously cook the meat and batter, said impaling member being moved by the movable section to elevate the cooked sandwich from the cavity when the movable section is moved to open position.

2. A sandwich cooker comprising relatively stationary and movable sections having batter receiving cavities, a meat impaling member pivotally mounted on the stationary section and movable to operative position within the adjacent cavity for centering the meat within said cavity, and electrical means for directly heating said sections and said impaling member to simultaneously cook the meat and batter, the inner end of the impaling member being moved by the movable section to elevated position above the cavity to permit ready removal of the cooked sandwich when the movable section is moved to open position.

3. A sandwich cooker comprising relatively stationary and movable sections having batter receiving cavities, a meat impaling member pivotally mounted on one section and movable to operative position within the adjacent cavity, electrical means for heating said sections and said impaling member to simultaneously cook the meat and batter, the pivoted end of the impaling member being extended longitudinally beyond the adjacent section, and an arm extending laterally from the movable section and adapted to depress the pivoted end of said impaling member and elevate the free end thereof out of the cavity when the movable section is moved to open position.

4. A sandwich cooker comprising pivotally united upper and lower sections having batter receiving cavities and provided with a longitudinal seating groove communicating therewith, the bottom wall of said groove being inclined downwardly to form a stop, a meat impaling member pivotally mounted in the groove and movable to operative position within the cavity, electrical means for heating said sections and the impaling member, the impaling member being extended longitudinally beyond its pivot, and an arm carried by the pivoted end of the upper section and adapted to engage the extended end of the impaling member for elevating the free end thereof out of the cavity when the upper section is moved to open position, the extended end of the impaling member by engagement with the inclined wall of the groove, serving to limit the downward pivotal movement thereof.

5. A sandwich cooker comprising pivotally united upper and lower sections, face plates secured to each section and provided with batter receiving cavities, insulating material surrounding the cavities and retained in position by said face plates, electrical heating elements embedded in the insulating material, an impaling member pivotally mounted on the lower section, an electrical heating element disposed within the impaling member, means for connecting said heating elements in an electrical circuit, and means carried by the upper section and adapted to engage the impaling member for elevating the free end of the impaling member from the cavity in the lower section when the upper section is moved to open position, thereby to permit the removal of the cooked sandwich.

6. A sandwich cooker comprising pivotally united upper and lower sections, face plates detachably secured to said sections and provided with batter receiving cavities, the face plate of the lower section having a groove formed therein opening through the rear of the section and into said cavity, insulating material within the section, electrical heating elements embedded in the insulating material, a meat impaling member pivotally mounted in the groove, an electrical heating element disposed within the impaling member, means for connecting the heating elements in an electrical circuit, and means carried by the upper section and adapted to engage the impaling member to elevate the free end thereof and permit the impalement of a sausage thereon.

7. A sandwich cooker comprising pivotally united upper and lower sections, face plates secured to said sections and provided with batter receiving cavities, the face plate of the lower section having a groove formed therein and communicating with the adjacent cavity, a meat impaling member having lateral trunnions journaled in the face plate of the lower section, a cover plate extending over said trunnions, electrical heating elements for cooking batter in the cavities, an electrical heating element disposed within the impaling member, means for connecting said heating elements in an electrical circuit, and means carried by the upper section and adapted to engage the adjacent end of the impaling member for elevating the free end thereof when said upper section is moved to open position.

8. A sandwich cooker comprising upper and lower pivotally united sections, face plates detachably secured to said sections and provided with batter receiving cavities, the face plate of the lower section being provided with an enlargement having bearings formed therein and having a longitudinal groove opening through one end of the section and communicating with the adjacent cavity, a hollow tapered meat impaling member pivotally mounted in said groove and provided with lateral trunnions for engaging the bearings, a face plate for holding the trunnions in said bearings, the lower wall of the groove at the front end thereof constituting a stop to limit the downward movement of the impaling member within the cavity and the lower wall of the groove at the rear end thereof being inclined downwardly to form a stop to limit the upward movement of the impaling member, electrical means for heating the cavities and the interior of the impaling member, means for connecting said heating means in an electrical circuit, and an arm carried by the upper section and adapted to engage and force the adjacent end of the impaling member against the inclined stop for supporting the free end of the impaling member in elevated position when the upper section is moved to open position.

9. A sandwich cooker comprising coacting upper and lower sections one of which constitutes a base and the other a cover, face plates carried by said sections and provided with batter receiving cavities, a hollow meat impaling member pivoted on the lower section, electrical means for heating the cavities and said impaling member and including an electrical circuit, means carried by the upper section for moving the free end of the impaling member to elevated position when said upper section is moved to open position, means for limiting the downward movement of the free end of the impaling member and centering said impaling member within the adjacent cavity, and means for limiting the downward movement of the pivoted end of said impaling member.

WILLIAM F. MERRITT. [L. S.]